US010877606B2

United States Patent
Khajeh et al.

(10) Patent No.: US 10,877,606 B2
(45) Date of Patent: Dec. 29, 2020

(54) METHOD AND APPARATUS FOR ISOLATING ULTRASONIC TOUCH SENSOR FROM REFLECTIONS IN A DEVICE HOUSING

(71) Applicant: Apple Inc., Cupertino, CA (US)

(72) Inventors: Ehsan Khajeh, San Jose, CA (US); Ala'a Al-Okaily, San Jose, CA (US); Brian Michael King, Saratoga, CA (US); George Ho Yin Mak, Santa Clara, CA (US); Supratik Datta, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/390,911

(22) Filed: Apr. 22, 2019

(65) Prior Publication Data
US 2020/0333914 A1    Oct. 22, 2020

(51) Int. Cl.
*G06F 3/043*  (2006.01)

(52) U.S. Cl.
CPC ............ *G06F 3/0436* (2013.01); *G06F 3/043* (2013.01)

(58) Field of Classification Search
CPC ....... G06F 3/0436; G06F 3/043; G01N 29/28; G01N 29/2437; G01N 2291/044; G01N 2291/0231; G01N 2291/0422; G01N 2291/106; G06K 9/0002
See application file for complete search history.

(56) References Cited

U.S. PATENT DOCUMENTS

| | | | |
|---|---|---|---|
| 5,483,261 | A | 1/1996 | Yasutake |
| 5,488,204 | A | 1/1996 | Mead et al. |
| 5,825,352 | A | 10/1998 | Bisset et al. |
| 5,835,079 | A | 11/1998 | Shieh |

(Continued)

FOREIGN PATENT DOCUMENTS

| | | |
|---|---|---|
| JP | 2000163031 | 6/2000 |
| JP | 2002342033 | 11/2002 |

OTHER PUBLICATIONS

Lee, S.K. et al. (Apr. 1985). "A Multi-Touch Three Dimensional Touch-Sensitive Tablet," Proceedings of CHI: ACM Conference on Human Factors in Computing Systems, pp. 21-25.

(Continued)

*Primary Examiner* — Xuemei Zheng
(74) *Attorney, Agent, or Firm* — Kubota & Basol LLP (57) ABSTRACT

Acoustic touch sensing system architectures and methods for acoustic touch sensing can be used to detect a position of an object touching a surface. Acoustic touch sensing can utilize transducers (e.g., piezoelectric) to simultaneously transmit ultrasonic waves along a surface and through a thickness of a material. The location of the object can be determined based on the amount of time elapsing between the transmission of the waves and receipt of the reflected waves. In some examples, an acoustic touch sensing system can be insensitive to water contact on the device surface, and thus acoustic touch sensing can be used for touch sensing in devices that may become wet or fully submerged in water. In some examples, techniques such as isolation and absorption of acoustic energy can be used to mitigate acoustic energy reflected by portions of the electronic device and interfere with the acoustic touch sensing operation.

20 Claims, 8 Drawing Sheets

(56) References Cited

U.S. PATENT DOCUMENTS

| | | | |
|---|---|---|---|
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |
| 2006/0058706 | A1* | 3/2006 | Frey .................... G10K 11/004 601/2 |
| 2006/0197753 | A1 | 9/2006 | Hotelling |
| 2014/0352440 | A1* | 12/2014 | Fennell ................ G01N 29/22 73/632 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

METHOD AND APPARATUS FOR ISOLATING ULTRASONIC TOUCH SENSOR FROM REFLECTIONS IN A DEVICE HOUSING

FIELD OF THE DISCLOSURE

This relates generally to touch sensing systems, and more particularly, to isolation and absorption of ultrasonic wave reflections.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface. Capacitive-type touch sensing systems, however, can experience reduced performance due to conductive, electrically-floating objects (e.g., water droplets) in contact with the touch-sensitive surface.

SUMMARY

This relates to acoustic touch sensing systems and methods for acoustic touch sensing. The position of an object touching a surface can be determined using time-of-flight (TOF) techniques, for example. Acoustic touch sensing can utilize transducers, such as piezoelectric transducers, to transmit ultrasonic waves along a surface and/or through the thickness of one or more materials (e.g., along a surface of a cover material of an electronic device). As the wave propagates along the surface and/or through the thickness of the one or more materials, an object (e.g., finger, stylus, etc.) in contact with the surface can interact with the transmitted wave, causing a reflection of at least a portion of the transmitted wave. Portions of the reflected wave energy after interaction with the object can be measured to determine the touch location of the object on the surface of the device. For example, one or more transducers (e.g., acoustic transducers) coupled to a surface of a device can be configured to transmit an acoustic wave along the surface and/or through the thickness of the one or more materials and can receive a portion of the wave reflected back when the acoustic wave encounters a finger or other object touching the surface. The location of the object can be determined, for example, based on the amount of time elapsing between the transmission of the wave and the detection of the reflected wave. Acoustic touch sensing can be used instead of, or in conjunction with, other touch sensing techniques, such as resistive, optical, and/or capacitive touch sensing. In some examples, the acoustic touch sensing techniques described herein can be used on a metal housing surface of a device, which may be unsuitable for capacitive or resistive touch sensing due to interference (e.g., of the housing with the capacitive or resistive sensors housed in the metal housing). In some examples, the acoustic touch sensing techniques described herein can be used on a glass surface of a display or touch screen. In some examples, an acoustic touch sensing system can be configured to be insensitive to contact on the device surface by water, and thus acoustic touch sensing can be used for touch sensing in devices that may become wet or fully submerged in water.

DETAILED DESCRIPTION

In the following description of various examples, reference is made to the accompanying drawings which form a part hereof, and in which it is shown by way of illustration specific examples that can be practiced. It is to be understood that other examples can be used and structural changes can be made without departing from the scope of the various examples.

This relates to acoustic touch force sensing systems and methods for acoustic touch sensing. The position of an object touching a surface can be determined using time-of-flight (TOF) techniques, for example. Acoustic touch sensing can utilize transducers, such as piezoelectric transducers, to transmit ultrasonic waves along a surface and/or through the thickness of one or more materials (e.g., along a surface of a cover material of an electronic device). As the wave propagates along the surface and/or through the thickness of the one or more materials, an object (e.g., finger, stylus, etc.) in contact with the surface can interact with the transmitted wave, causing a reflection of at least a portion of the transmitted wave. Portions of the transmitted wave energy after interaction with the object can be measured to determine the touch location of the object on the surface of the device. For example, one or more transducers (e.g., acoustic transducers) coupled to a surface of a device can be configured to transmit an acoustic wave along the surface and/or through the thickness of the one or more materials and can receive a portion of the wave reflected back when the acoustic wave encounters a finger or other object touching the surface. The location of the object can be determined, for example, based on the amount of time elapsing between the transmission of the wave and the detection of the reflected wave. Acoustic touch sensing can be used instead of, or in conjunction with, other touch sensing techniques, such as resistive, optical, and/or capacitive touch sensing. In some examples, the acoustic touch sensing techniques described herein can be used on a metal housing surface of a device, which may be unsuitable for capacitive or resistive touch sensing due to interference (e.g., of the housing with the capacitive or resistive sensors housed in the metal housing). In some examples, the acoustic touch sensing techniques described herein can be used on a glass surface of a display or touch screen. In some examples, an acoustic touch sensing system can be configured to be insensitive to contact on the device surface by water, and thus acoustic touch sensing can be used for touch sensing in devices that may become wet or fully submerged in water.

Figures 1A, 1B, 1C, 1D, 1E:
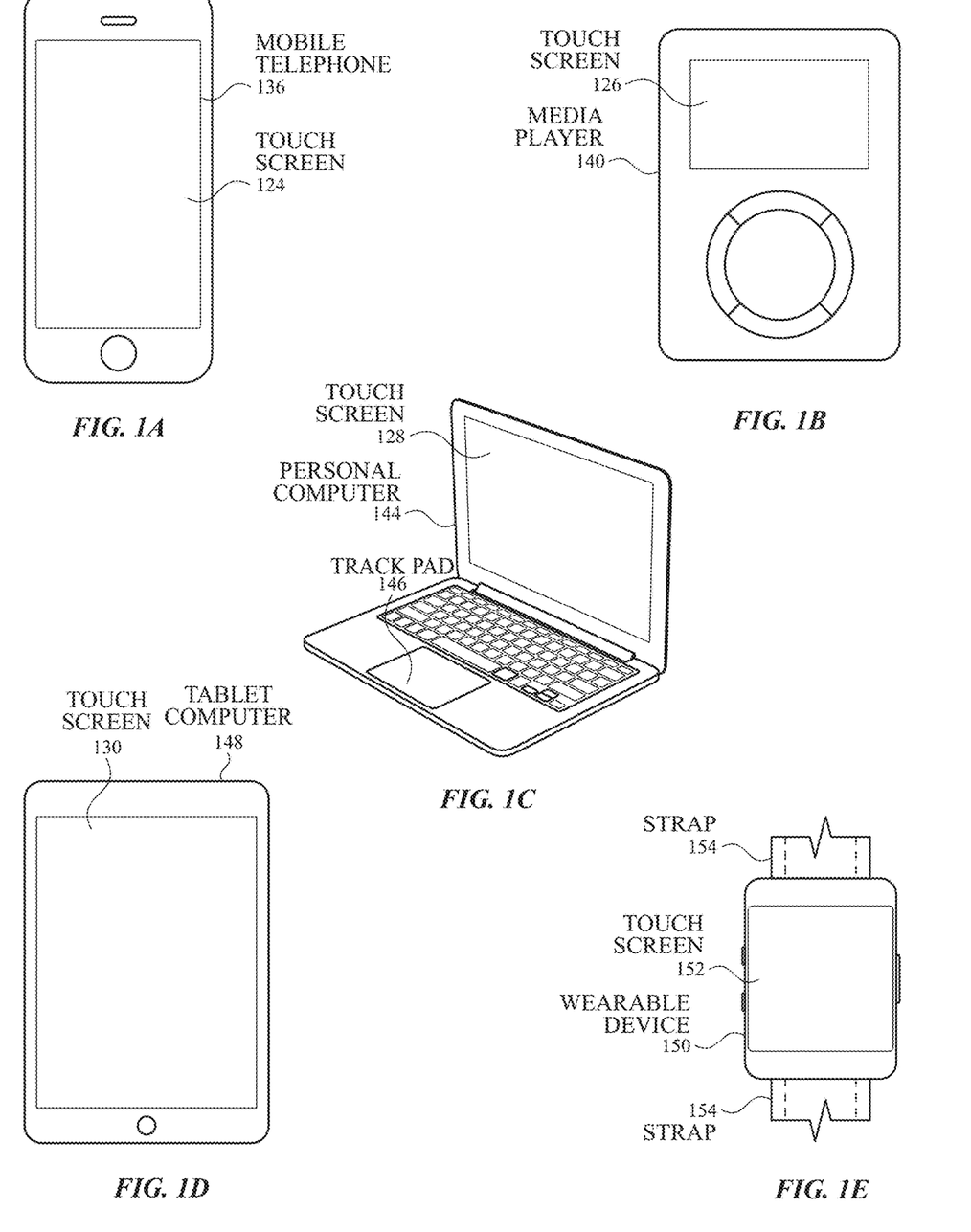
FIGS. 1A-1E illustrate exemplary systems with touch screens that can include acoustic sensors for detecting contact between an object and a surface of the system according to examples of the disclosure.

FIGS. 1A-1E illustrate exemplary systems with touch screens that can include acoustic sensors for detecting contact between an object (e.g., a finger or stylus) and a surface of the system according to examples of the disclosure. Detecting contact can include detecting a location of contact on a touch-sensitive surface. FIG. 1A illustrates an exemplary mobile telephone 136 that includes a touch screen 124 and can include an acoustic touch sensing system according to examples of the disclosure. FIG. 1B illustrates an example digital media player 140 that includes a touch screen 126 and can include an acoustic touch sensing system according to examples of the disclosure. FIG. 1C illustrates an example personal computer 144 that includes a touch screen 128 and a track pad 146, and can include an acoustic touch sensing system according to examples of the disclosure. FIG. 1D illustrates an example tablet computing device 148 that includes a touch screen 130 and can include an acoustic touch sensing system according to examples of the disclosure. FIG. 1E illustrates an example wearable device 150 (e.g., a watch) that includes a touch screen 152 and can include an acoustic touch sensing system according to examples of the disclosure. Wearable device 150 can be coupled to a user via strap 154 or any other suitable fastener. It should be understood that the example devices illustrated in FIGS. 1A-1E are provided by way of example, and other types of devices can include an acoustic touch sensing system for detecting contact between an object and a surface of the device.

Acoustic sensors can be incorporated in the above described systems to add acoustic touch sensing capabilities to a surface of the system. For example, in some examples, a touch screen (e.g., capacitive, resistive, etc.) can be augmented with acoustic sensors to provide a touch sensing capability for use in wet environments or under conditions where the device may get wet (e.g., exercise, swimming, rain, washing hands). In some examples, an otherwise non-touch sensitive display screen can be augmented with acoustic sensors to provide a touch sensing capability. In such examples, a touch screen can be implemented without the stack-up required for a capacitive touch screen. In some examples, the acoustic sensors can be used to provide touch sensing capability for a non-display surface. For example, the acoustic sensors can be used to provide touch sensing capabilities for a track pad 146, a button, a scroll wheel, part or all of the housing or any other surfaces of the device (e.g., on the front, rear or sides).

Figure 2:
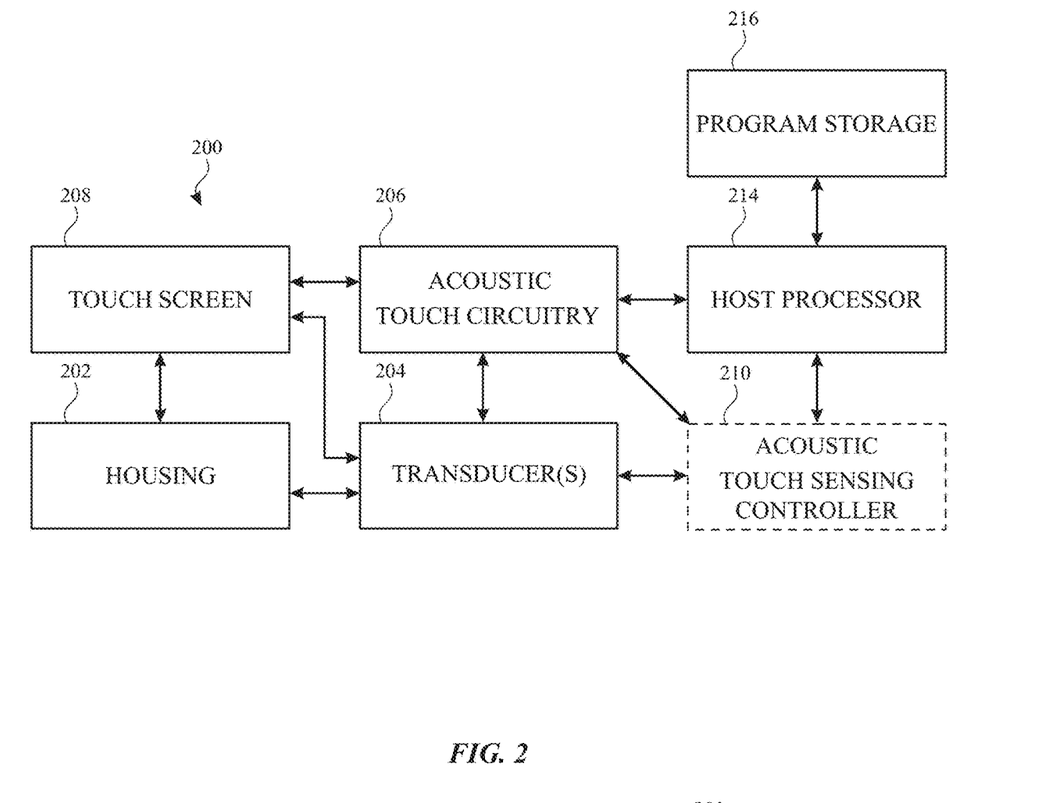
FIG. 2 illustrates an exemplary block diagram of an electronic device including an acoustic touch sensing system according to examples of the disclosure.

FIG. 2 illustrates an exemplary block diagram of an electronic device including an acoustic touch sensing system according to examples of the disclosure. In some examples, housing 202 of device 200 (e.g., corresponding to devices 136, 140, 144, 148, and 150 above) can be coupled (e.g., mechanically) with one or more acoustic transducers 204. In some examples, transducers 204 can be piezoelectric transducers, which can be made to vibrate by the application of electrical signals when acting as a transmitter, and generate electrical signals based on detected vibrations when acting as a receiver. In some examples, transducers 204 can be formed from a piezoelectric ceramic material (e.g., PZT or KNN) or a piezoelectric plastic material (e.g., PVDF or PLLA). Similarly, transducers 204 can produce electrical energy as an output when vibrated. In some examples, transducers 204 can be bonded to housing 202 by a bonding agent (e.g., a thin layer of stiff epoxy). In some examples, transducers 204 can be deposited on one or more surfaces (e.g., a cover glass of touch screen 208 and/or a deformable material as described in more detail below) through processes such as deposition, lithography, or the like. In some examples, transducers 204 can be bonded to the one or more surfaces using electrically conductive or non-conductive bonding materials. When electrical energy is applied to transducers 204 it can cause the transducers to vibrate, the one or more surfaces in contact with the transducers can also be caused to vibrate, and the vibrations of the molecules of the material can propagate as an acoustic wave through the one or more surfaces/materials. In some examples, vibration of transducers 204 can be used to produce ultrasonic acoustic waves at a selected frequency over a broad frequency range (e.g., 500 kHz-10 MHz) in the medium of the surface of the electronic device which can be metal, plastic, glass, wood, or the like. It should be understood that other frequencies outside of the exemplary range above can be used while remaining within the scope of the present disclosure.

In some examples, transducers 204 can be partially or completely disposed on (or coupled to) a portion of a touch screen 208. For example, touch screen 208 (e.g., capacitive) may include a cover material such as a glass panel (cover glass) or a plastic cover, and a display region of the touch screen may be surrounded by a non-display region (e.g., a black border region surrounding the periphery of the display region of touch screen 208). In some examples, transducers 204 can be disposed partially or completely in the black mask region of touch screen 208 (e.g., on the back side of the glass panel behind the black mask) such that the transducers are not visible (or are only partially visible) to a user.

Device 200 can further include acoustic sensing circuitry 206, which can include circuitry for driving electrical signals to stimulate vibration of transducers 204 (e.g., transmit circuitry), as well as circuitry for sensing electrical signals output by transducers 204 when the transducer is stimulated by received acoustic energy (e.g., receive circuitry). In some examples, timing operations for acoustic touch circuitry 206 can optionally be provided by a separate acoustic touch sensing controller 210 that can control timing of and other operations by acoustic touch circuitry 206. In some examples, touch sensing controller 210 can be coupled between acoustic touch circuitry 206 and host processor 214. In some examples, acoustic touch sensing controller functions can be integrated with acoustic touch circuitry 206 (e.g., on a single integrated circuit). In particular, examples integrating touch circuitry and controller functionality into a single integrated circuit can reduce the number of transducers (sensor elements) and electronic chipsets for a touch sensing device. Output data from acoustic touch circuitry 206 can be output to a host processor 214 for further processing to determine a location of an object contacting the device as will be described in more detail below. In some examples, the processing for determining the location of the contacting object can be performed by acoustic touch sensing circuitry 206, acoustic touch sensing controller 210, host processor 214, or a separate sub-processor of device 200 (not shown).

Host processor 214 can receive acoustic or other touch outputs (e.g., capacitive) and perform actions based on the touch outputs. Host processor 214 can also be connected to program storage 216 and touch screen 208. Host processor 214 can, for example, communicate with touch screen 208 to generate an image on touch screen 208, such as an image of a user interface (UI), and can use touch sensing circuitry 212 and/or acoustic touch sensing circuitry 206 (and, in some examples, their respective controllers) to detect a touch on or near touch screen 208 such as a touch input to the displayed UI. The touch input can be used by computer programs stored in program storage 216 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 214 can also perform additional functions that may not be related to touch processing.

Note that one or more of the functions described herein can be performed by firmware stored in memory and executed by touch circuitry 212 and/or acoustic touch sensing circuitry 206 (or their respective controllers), or stored in program storage 216 and executed by host processor 214. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that device 200 is not limited to the components and configuration of FIG. 2, but can include other or additional components in multiple configurations according to various examples. Additionally, the components of device 200 can be included within a single device, or can be distributed between multiple devices. Additionally, it should be understood that the connections between the components is exemplary and different unidirectional or bidirectional connections can be included between the components depending on the implementation, irrespective of the arrows shown in the configuration of FIG. 2.

Figure 3A:
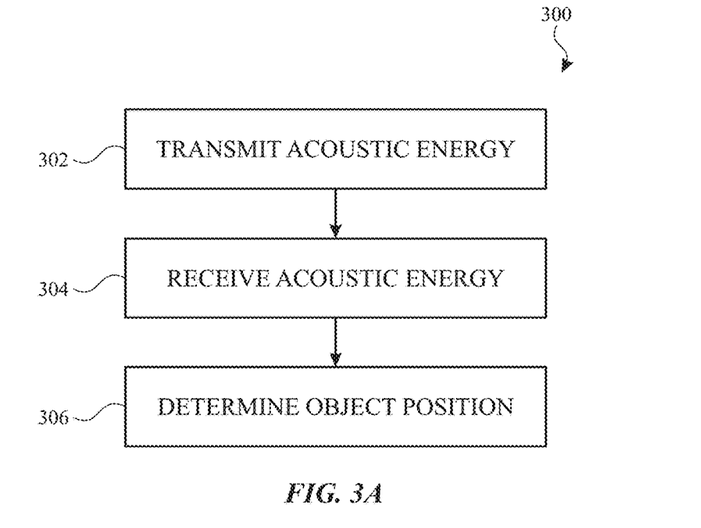
FIG. 3A illustrates an exemplary process for acoustic touch sensing of an object in contact with a touch sensitive surface according to examples of the disclosure.
Figure 3B:
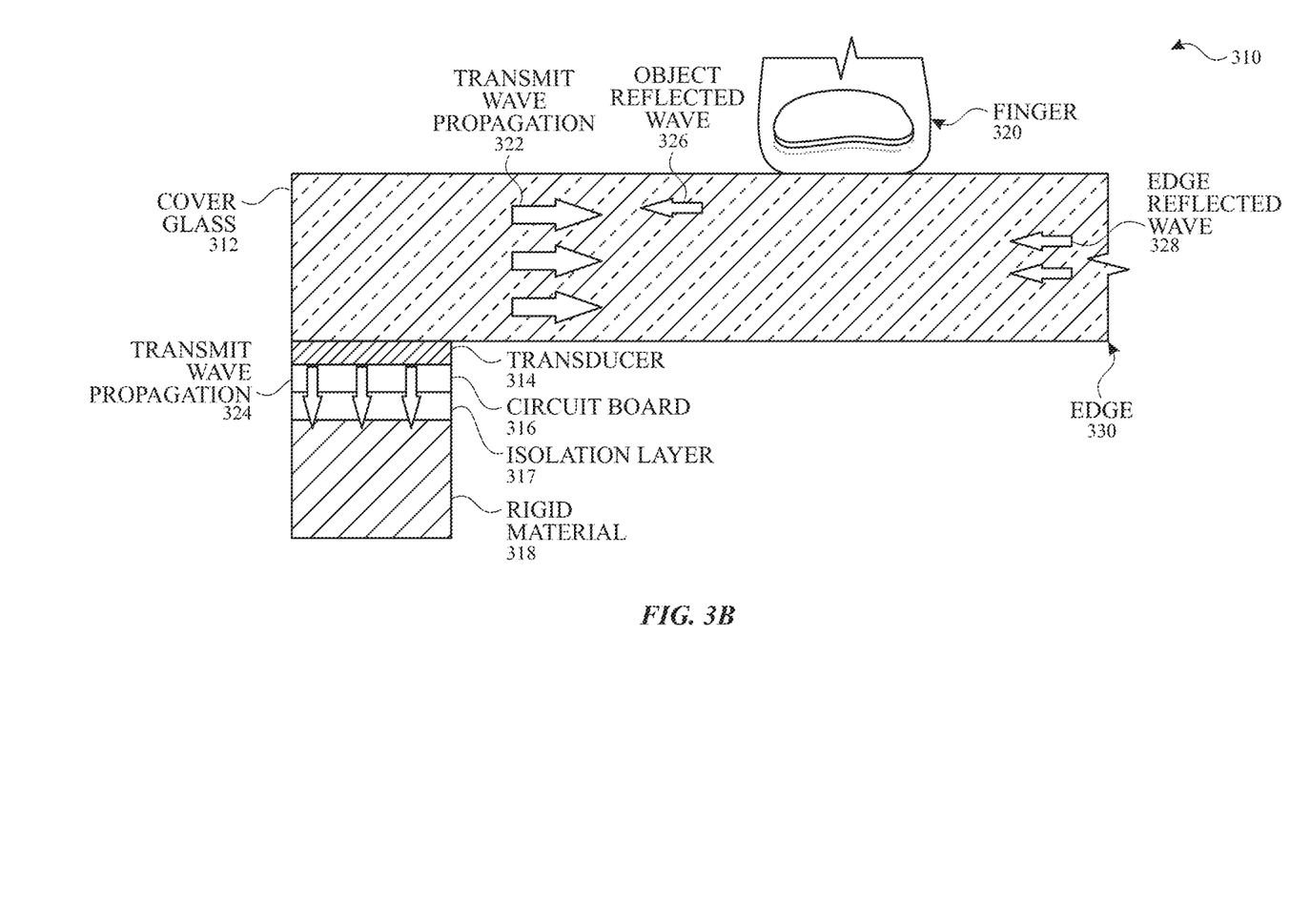
FIG. 3B illustrates an exemplary system, which can perform an exemplary process for acoustic touch sensing of an object in contact with a touch sensitive surface, according to examples of the disclosure.

FIG. 3A illustrates an exemplary process 300 for acoustic touch sensing of an object in contact with a touch sensitive surface according to examples of the disclosure. FIG. 3B illustrates an exemplary system 310, which can perform an exemplary process 300 for acoustic touch sensing of an object in contact with a touch sensitive surface, according to examples of the disclosure. At 302, acoustic energy can be transmitted (e.g., by one or more transducers 204) along a surface and/or through the thickness of a material in the form of an ultrasonic wave, for example. For example, as illustrated in FIG. 3B, transducer 314 can generate a transmit ultrasonic wave 322 in cover material 312 (e.g., glass or other material capable of propagating an ultrasonic wave). In some examples, the wave can propagate as a compressive wave, a guided wave such as a shear horizontal wave, a Rayleigh wave, a Lamb wave, a Love wave, a Stoneley wave, or a surface acoustic wave. In some examples, a shear poled transducer 314 can be used to generate shear horizontal waves propagating through the cover material. Other propagation modes for the transmitted acoustic energy can also exist based on the properties of the surface material, geometry and the manner of energy transmission from the transducers to the surface of the device. In some examples, the surface can be formed from glass, plastic, or sapphire crystal (e.g., touch screen 208, cover material 312) or the surface can be formed from metal, ceramics, plastic, or wood (e.g., housing 202). Transmitted energy can propagate along the surface (e.g., cover material 312) and/or through the thickness until a discontinuity in the surface is reached (e.g., an object, such as a finger 320, in contact with the surface), which can cause a portion of the energy to reflect. In some examples, a discontinuity can occur at edges (e.g., edge 330) of the cover material 312 (e.g., when the ultrasonic wave propagates to the edge of the surface opposite the transducer). When the transmitted energy reaches one of the discontinuities described above, some of the energy can be reflected, and a portion of the reflected energy (e.g., object-reflected wave 326, edge-reflected wave 328) can be directed to one or more transducers (e.g., transducers 204, 314). In some examples, water or other fluids in contact with the surface of the device (e.g., device 200) will not act as a discontinuity to the acoustic waves, and thus the acoustic touch sensing process can be effective for detecting the presence of an object (e.g., a user's finger) even in the presence of water drops (or other low-viscosity fluids) on the surface of the device or even while the device is fully submerged.

At 304, returning acoustic energy can be received, and the acoustic energy can be converted to an electrical signal by one or more transducers (e.g., transducers 204). For example, as illustrated in FIG. 3B, object-reflected wave 326 can be received by transducer 314 and converted into an electrical signal. In addition, the transmission wave can propagate in the opposite direction in transmission wave propagation direction 324, where the transmitted wave propagates toward rigid material 318. The rigid material 318 can be a part of a housing of an electronic device, such as the devices illustrated in FIG. 1 above. In some examples, the rigid material can also include discontinuities that can cause a portion of the energy transmitted in wave propagation direction 324 to also be reflected back toward the transducer 314. In some examples, the energy reflected by discontinuities within the housing can result in acoustic energy ringing that can interfere with the detection of reflected waves from an object (e.g., a user's finger). Accordingly, the examples below will further describe techniques for mitigating the effects of ringing on acoustic touch detection.

At 306, the acoustic sensing system can determine whether one or more objects is contacting the surface of the device, and can further detect the position of one or more objects based on the received acoustic energy. In some examples, a distance of the object from the transmission source (e.g., transducers 204) can be determined from a time-of-flight between transmission and reception of reflected energy, and a propagation rate of the ultrasonic wave through the material. In some examples, baseline reflected energy from one or more intentionally included discontinuities (e.g., edges) can be compared to a measured value of reflected energy corresponding to the one or more discontinuities. The baseline reflected energy can be determined during a measurement when no object (e.g., finger) is in contact with the surface. Deviations of the reflected energy from the baseline can be correlated with a presence of an object touching the surface.

Although process 300, as described above, generally refers to reflected waves received by the same transducer(s) that transmitted the waves, in some examples, the transmitter and receiver functions can be separated such that the transmission of acoustic energy at 302 and receiving acoustic energy at 304 may occur at different co-located transducers (e.g., one transducer in a transmit configuration and one transducer in a receive configuration). In some examples, the acoustic energy can be transmitted along and/or through the surface (e.g., cover material 312) by one or more transducers (e.g., transducer 314) and received on an opposite edge (e.g., edge 330) of the surface by one or more additional transducers (not shown). The attenuation of the received acoustic energy can be used to detect the presence of and/or identify the position of one or more objects (e.g., finger 320) on the surface (e.g., cover material 312). Exemplary device configurations and measurement timing examples that can be used to implement process 300 will be described in further detail below. In some examples, the transmitted acoustic energy from transducer 314 can be received at the transmitting transducer and also received at one or more other non-transmitting transducers located in different positions (e.g., at different edges of the surface (e.g., cover material 312). Energy can reflect from one or more objects at multiple angles, and the energy received at all of the receiving transducers can be used to determine the position of the one or more objects. In some examples, the non-transmitting transducers can be free of artifacts that can be associated with transmitting acoustic energy (e.g., ringing).

Figure 4:
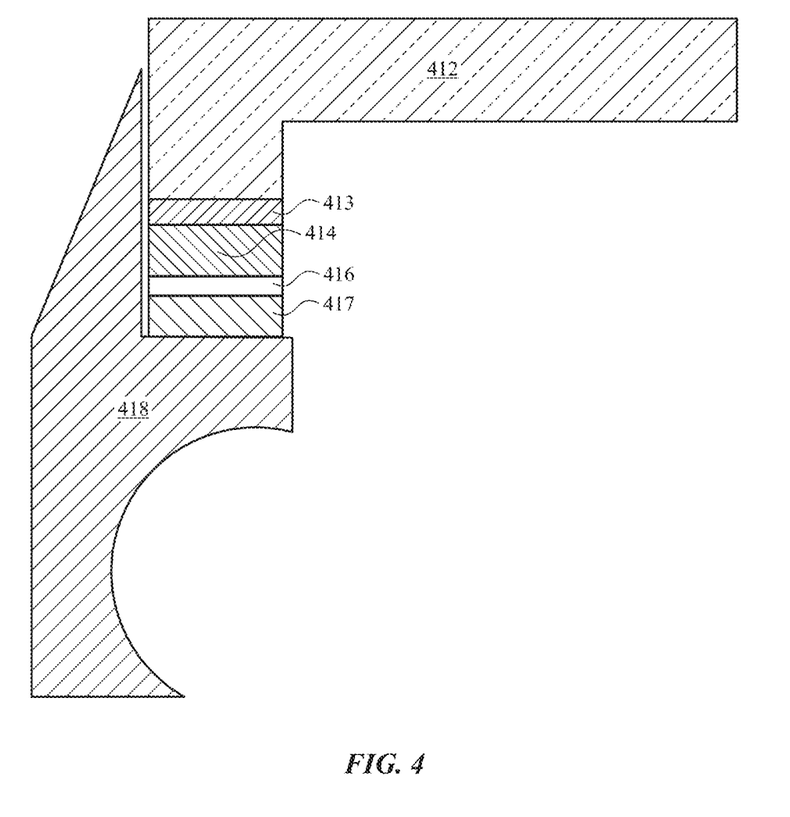
FIG. 4 illustrates a cross section of a portion of an exemplary electronic device including an acoustic touch sensing system utilizing an isolation layer according to examples of the disclosure.

FIG. 4 illustrates a cross section of a portion of an exemplary electronic device including an acoustic touch sensing system utilizing an isolation layer according to examples of the disclosure. The electronic device can include a cover material 412 (which can correspond to cover material 312 above). In some examples, the cover material 412 can be coupled to a transducer 414 such that a wave transmitted by the transducer can propagate along a surface of the cover material. In some examples, adhesive layer 413 can be used to couple the transducer 414 to the cover material. In some examples, the adhesive layer 413 can be a pressure sensitive adhesive material. In some examples, the adhesive layer 413 can be selected from materials that have one or more desirable mechanical characteristics such as good adhesion, chemical resistance, shock absorption, and water sealing. In some examples, the adhesive layer 413 can also have the characteristic of allowing energy from the transducer to pass through into the cover material 412 for acoustic touch sensing. In some examples, the adhesive layer 413 can be selected to have an acoustic impedance match with the transducer 414 and the cover material 412 in order to achieve high amounts of acoustic energy transmission into the cover material. In some examples, the adhesive layer 413 can be selected to have an acoustic impedance (e.g., shear modulus) match with the transducer 414 and cover material 412 for a specific wave type that matches with the operation mode of the transducer (e.g., impedance matched for a shear horizontal wave produced by a transducer operating with a shear poled transducer). In some examples, the transducer 414 can be disposed on a circuit board 416 that can include electrical connections for driving signals to produce a transmit wave. In some examples, the circuit board 416 can further include electrical connections for sensing signals resulting from reflected acoustic waves received at the transducer 414. In some examples, the circuit board 416 can be coupled to the housing 418 of the electronic device by an isolation layer 417. It should also be understood that in some examples, the order of the stackup of the circuit board 416 and transducer 414 can be flipped without departing from the scope of the present disclosure. In addition, in some examples, additional layers can present between the cover material 412 and the housing 418 without departing from the scope of the disclosure. In addition, in some examples, the transducer 414 may not be directly connected to a circuit board 416 in a stackup, but may be coupled to electrical connections using other techniques known in the art without departing from the scope of the present disclosure. In some examples, the isolation layer 417 can be selected to have an effect of acoustically isolating the housing and the transducer to prevent reflection of acoustic energy by the housing to the transducer 414. In some examples, the isolation layer 417 also provides sealing for the electronic device to prevent intrusion of outside materials such as moisture, dust, and other contaminants from entering into the inside of the housing of the electronic device. In some examples, the adhesive material for the isolation layer 417 is selected to have a significant shear impedance mismatch with the transducer assembly and the housing, which can prevent acoustic energy from reaching the housing 418 and thus prevent the acoustic energy from being reflected by the housing. In some examples, the adhesive material for the isolation layer 417 is selected to have a high acoustic attenuation coefficient. In some examples, the adhesive material for the isolation layer 417 can be selected to have both a shear impedance mismatch and a high acoustic attenuation coefficient. In some examples, at each boundary between materials with different acoustic impedance properties, a portion of the energy incident on the boundary can be reflected at the boundary and a portion of the energy can be transmitted past the boundary. In the configuration of FIG. 4, there can be considered a first boundary between the circuit board 416 and the isolation layer 417 and a second boundary between the isolation layer and the housing 418. In some examples, each boundary can have a transmission coefficient that represents a percentage of the energy incident upon that boundary that will transmit beyond the boundary. For example, the first boundary can have a coefficient $T_1$ and the second boundary can have a coefficient $T_2$. A total amount of transmission of acoustic energy from the transducer to the housing $T_{tot}$ can be represented as follows:

$$T_{tot} = T_1 \times T_2 \quad (1)$$

For example, if $T_1=0.5$ (i.e., 50% of incident energy transmits past the first boundary) and $T_2=0.4$ (i.e., 40% of incident energy transmits past the second boundary), then the total transmission of $T_{tot}=0.2$ (i.e., 20% of energy incident on the first boundary passes the second boundary). Furthermore, in order to be received as energy (e.g., ringing) at the transducer 414, the energy must pass again through the second boundary and the first boundary again, and thus the amount of energy returning to the transducer is $(T_{tot})^2$ multiplied by the incident energy transmitted by the transducer 414 toward the housing 418. In some examples, by preventing energy from transmitting into the housing by providing an isolation layer 417 with a large impedance mismatch, the presences of discontinuities within the housing 418 that can cause reflections of incident acoustic energy can be largely ignored. In other words, by sufficiently isolating the acoustic touch sensing system from the housing 418, the touch sensing system can be designed independently of the characteristics of the housing, thus significantly simplifying the design process.

In some examples, desired values for transmission coefficients can be obtained by selecting an isolation layer 417 with an impedance value that is different from the impedance value of the material that makes up the transducer 414 as well as the material that makes up the electronic device housing 418. In some examples, the impedance mismatch can be obtained by selecting a material for the isolation layer 417 that has a lower shear modulus than the housing 418 and the transducer 414 materials. In one example, the shear modulus of the transducer 414 may be approximately 20 gigapascals (GPa), for example, for a ceramic based transducer (e.g., PZT or KNN). In some examples, a pressure sensitive adhesive (PSA) with strong adhesion and good chemical resistance can have a shear modulus of about 0.4 GPa. In such an example, the ratio between shear modulus of the transducer and shear modulus of the PSA can be 50:1. In some examples, a PSA can be designed with a lower shear modulus, such as 0.02 GPa, which results in a ratio between shear modulus of the transducer and shear modulus of the PSA of 1000:1. In some examples, a ratio between the shear modulus of the transducer and the shear modulus of the PSA can be at least about 100:1. In some examples, a ratio between the shear modulus of the transducer and the shear modulus of the PSA can be at least about 250:1. In some examples, a ratio between the shear modulus of the transducer and the shear modulus of the PSA can be at least about 1000:1. In some examples, a ratio between the shear modulus of the transducer and the shear modulus of the PSA can be at least about 2000:1.

In some examples, a PSA having a low shear modulus for use as an isolation layer 417 can be a foam material. For example, a closed cell PSA foam with randomly located micro-air bubbles can have a shear modulus on the order of 0.01 to 0.04 GPa. In some examples, a PSA with a low shear modulus on the order of 0.02 GPa can also be formed by modifying chemical compositions of PSA materials that are typically available in the market. In particular, the physical property of the PSA that can be altered as a result of a chemical composition change is to make the PSA softer. In some examples, an additional benefit of a soft PSA can be improved shock absorption between the cover material 412 and the housing 418. It should be understood based on the above the PSA material used for the isolation layer 417 can have a different shear modulus from the PSA material used for the adhesive layer 413, where it is desirable for a large amount of energy to pass through into the cover material 412. In some examples, the ratio between the shear modulus of the adhesive layer 413 to the shear modulus of the isolation layer 417 can be at least about 10:1. In some examples, the ratio between the shear modulus of the adhesive layer 413 to the shear modulus of the isolation layer 417 can be at least about 100:1. In some examples, the ratio between the shear modulus of the adhesive layer 413 to the shear modulus of the isolation layer 417 can be at least about 1000:1.

It should also be understood that in addition to the effects of impedance mismatch on the amount of energy transmitted from transducer 414 to the housing 418, a portion of the energy that enters the isolation layer 417 can also be absorbed and converted into heat. In some examples, the amount of absorption of a particular material can depend upon the amount of distance the acoustic energy travels through the material. Thus it should be understood that the amount of absorption in the isolation layer 417 can also be affected by the thickness of the isolation layer. The phenomenon of acoustic absorption as described above may also be referred to as acoustic attenuation. In some examples, increasing the thickness of the absorption layer can serve to reduce the amount of energy transmitted into the housing 418, which will consequently reduce the amount of energy reflected from the housing. Furthermore, after the energy is reflected by the housing, reflected can pass through the isolation layer 417 again and experience further absorption as it passes through the isolation layer, thus further reducing the amount of energy that ultimately returns to the transducer 414 from the isolation layer after back-reflection by the housing 418. This effect can be further compounded in the case of an impedance mismatch between the isolation layer 417 and the transducer 414 and housing 418. In some examples, the impedance mismatch between the isolation layer 417 and transducer 414 and housing 418 can cause a change in the wavelength of the acoustic energy passing through the isolation layer relative to the wavelength of the acoustic energy transmitted by the transducer 414. This decrease in wavelength can further increase the amount of attenuation in the isolation layer 417, as the amount of attenuation is proportional to the number of wavelengths of distance that the acoustic wave traverses while passing through the thickness of the isolation layer. It should be noted that relying on the attenuation in isolation layer 417 alone without also providing an impedance mismatch as described above can result in the need for additional design considerations. In some examples, depending on the wavelength of the acoustic wave traveling through the isolation layer 417 and the thickness of the isolation layer, waves reflected by the housing 418 can either constructively or destructively interfere within the isolation layer. In some examples where the wavelength and thickness of the isolation layer 417 result in constructive interference, the attenuation effect of the isolation layer may have a minimal effect on the reflected acoustic waves and resultant ringing that can interfere with acoustic touch sensing as described above. Accordingly, when relying on attenuation of the isolation layer 417 as a primary technique for mitigating reflected acoustic energy and ringing, the propagation wavelength of the acoustic energy within the isolation layer and the thickness of the isolation layer can be designed to ensure destructive interference and to provide sufficient attenuation to attain the desired mitigation.

As stated above, a mismatch between the shear modulus of the housing of an electronic device housing 418 and the shear modulus of the isolation layer 417 can also be used to reduce the amount of transmission of acoustic energy from the transducer 414 toward the housing 418 that can result in reflections and ringing that can interfere with acoustic touch sensing. An electronic device housing 418 may be constructed from a variety of different metals and metal alloys or ceramic alloys. For example, an electronic device housing 418 made from aluminum can have a shear modulus between 25-30 GPa. As another example, an electronic device housing 418 made from steel can have a shear modulus between 75-80 GPa. For example, a steel electronic device housing 418 with a shear modulus of 80 GPa used in conjunction with a PSA having a shear modulus of 0.4 GPa can have a shear modulus ratio of 200:1. As another example, an electronic device housing 418 with a shear modulus of 30 GPa with a PSA having a shear modulus of 0.4 GPa can have a shear modulus ratio of 120:1. In both of the above examples, selecting a PSA with a lower shear modulus, e.g., the PSA with a shear modulus of 0.02 GPa as described above, can increase the impedance mismatch, resulting in a lower amount of energy being transmitted from the transducer 414 to the housing 418. For the exemplary steel electronic device housing 418 having a shear modulus of 80 GPa, the ratio between the housing shear modulus and isolation layer 417 shear modulus can be at least about 4000:1. Similarly, for the exemplary aluminum electronic device housing 418 having a shear modulus of 30 GPa, the ratio between the housing shear modulus and isolation layer 417 shear modulus can be at least about 1500:1.

FIGS. 5A-5B, 6A-6B, and 8A-8B illustrate exemplary waveforms of an amount of signal at a transducer 414 (on the vertical axis) plotted against time (on the horizontal axis). In the examples of FIGS. 5A-5B, 6A-6B, and 8A-8B, the vertical axis is intentionally not provided with amplitude values to illustrate the effects different techniques for mitigating the effects of reflected acoustic waves (e.g., ringing) in an electronic device including an ultrasonic touch sensor according to examples of the disclosure.

Figure 5A:
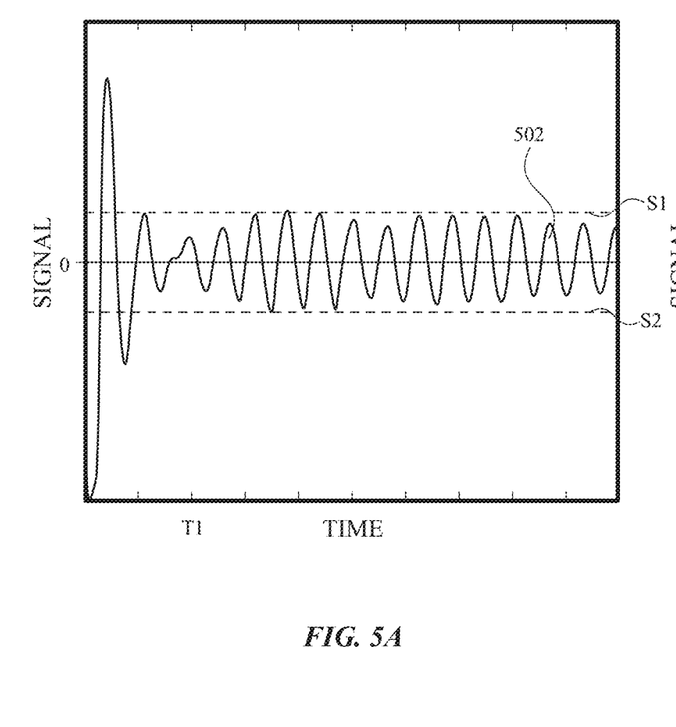
FIGS. 5A and 5B illustrate an effect of an isolation layer utilizing an impedance mismatch to reduce an effect of reflected acoustic waves in an electronic device incorporating acoustic touch sensing according to examples of the disclosure.
Figure 5B:
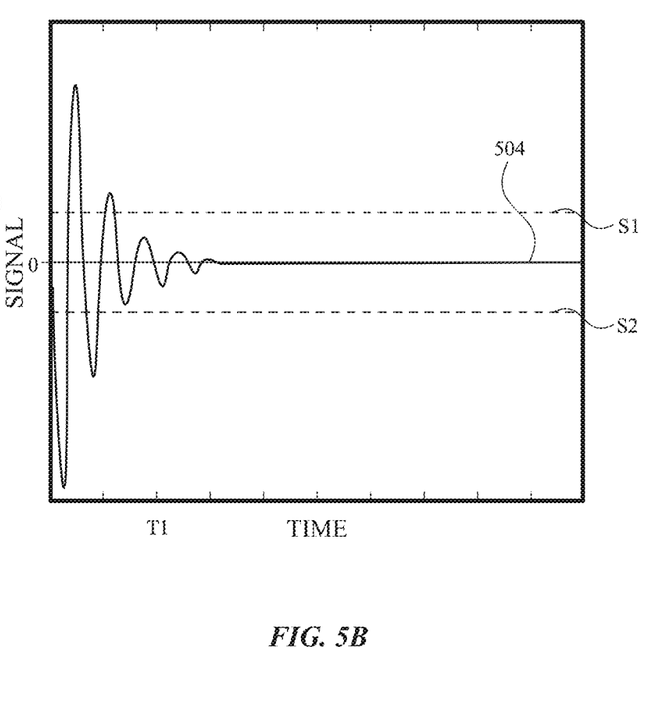

FIGS. 5A and 5B illustrate an effect of an isolation layer utilizing an impedance mismatch to reduce an effect of reflected acoustic waves (e.g., ringing) in an electronic device incorporating acoustic touch sensing according to examples of the disclosure. FIG. 5A illustrates a first waveform 502 representing ringing that can occur as a result of acoustic energy reflecting from the electronic device housing (e.g., 418 as shown in FIG. 4 above). In the illustrated figure, the time period from 0 to $T_1$ can represent a stimulation period during which the excitation energy from stimulation of the transducer is ringing with the transducer. After time $T_1$, the waveforms 502 and 504 can represent the electrical signal produced by the transducer resulting from receiving reflected acoustic waves that have exited the transducer. In the illustrated examples of FIG. 5A, the signal produced can be understood to result from ringing between the transducer and the housing of the electronic device (e.g., 418 as shown in FIG. 4 above). In the waveform 502, the amplitude of the waveform after time $T_1$ fluctuates between a maximum value of S1 and a minimum value of S2 and gradually diminishes as time increases. In FIG. 5B, it can be seen that for waveform 504, the waveform after time $T_1$ quickly reduces in amplitude, reaching a value close to zero within one or two periods of the ringing. As explained above with regard to FIG. 4, the amount of energy returning to the transducer from the housing scales with $(T_{tot})^2$. The examples of FIGS. 5A and 5B can correspond, for example, to a difference between an isolation layer 417 PSA having a shear modulus of 0.4 GPa and an isolation layer PSA having a shear modulus of 0.02 GPa as described above with regard to FIG. 4.

Figure 6A:
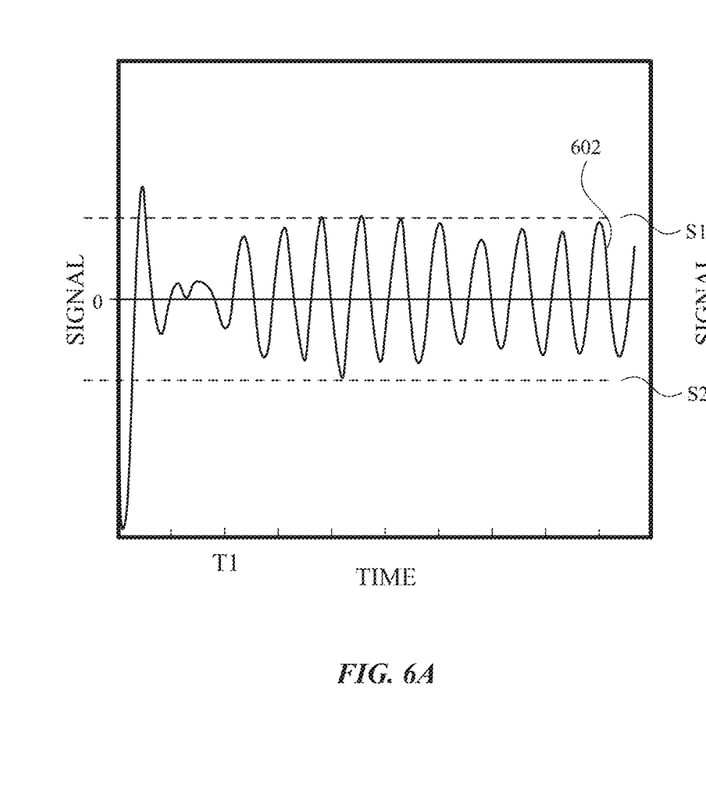
FIGS. 6A and 6B illustrate an effect of an isolation layer utilizing an increased thickness to reduce an effect of reflected acoustic waves in an electronic device incorporating acoustic touch sensing according to examples of the disclosure.
Figure 6B:
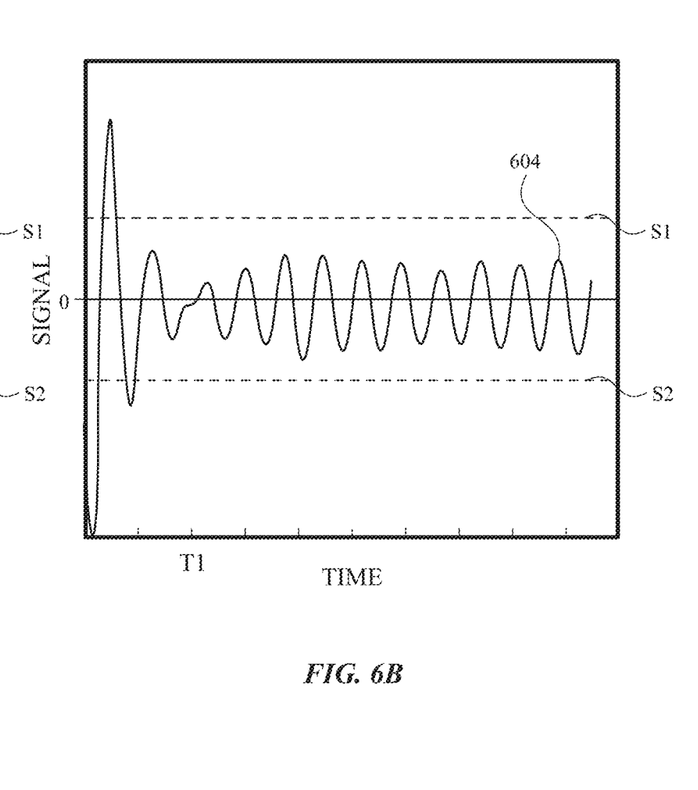

FIGS. 6A and 6B illustrate an effect of an isolation layer utilizing an increased thickness to reduce an effect of reflected acoustic waves (e.g., ringing) in an electronic device incorporating acoustic touch sensing according to examples of the disclosure. FIG. 6A illustrates a first waveform 602 representing ringing that can occur as a result of acoustic energy reflecting from the electronic device housing (e.g., 418 as shown in FIG. 4 above). In the illustrated figure, the time period from 0 to $T_1$ can represent a stimulation period during which the excitation energy from stimulation of the transducer is ringing with the transducer. After time $T_1$, the waveforms 602 and 604 can represent the electrical signal produced by the transducer resulting from receiving reflected acoustic waves that have exited the transducer. In the illustrated examples of FIG. 6A, the signal produced can be understood to result from ringing between the transducer and the housing of the electronic device (e.g., 418 as shown in FIG. 4 above). In the waveform 602, the amplitude of the waveform after time $T_1$ fluctuates between a maximum value of S1 and a minimum value of S2 and gradually diminishes as time increases. In FIG. 6B, it can be seen that for waveform 604, the waveform after time $T_1$ reduces in amplitude somewhat more quickly than the waveform 602 in FIG. 6A, but much less quickly than the attenuation shown resulting from an impedance mismatch as shown in waveform 504 in FIG. 5B. The examples of FIGS. 6A and 6B can correspond, for example to a difference between two isolation layers 417 PSA having an identical shear modulus of 0.4 GPa, but the thickness of the isolation layer corresponding to the waveform 604 of FIG. 6B is three times as much as the thickness of the isolation layer corresponding to the waveform 602 of FIG. 6A. The difference between waveforms 602 and 604 can thus be attributed to the acoustic absorption effect described above with regard to FIG. 4.

Figure 7:
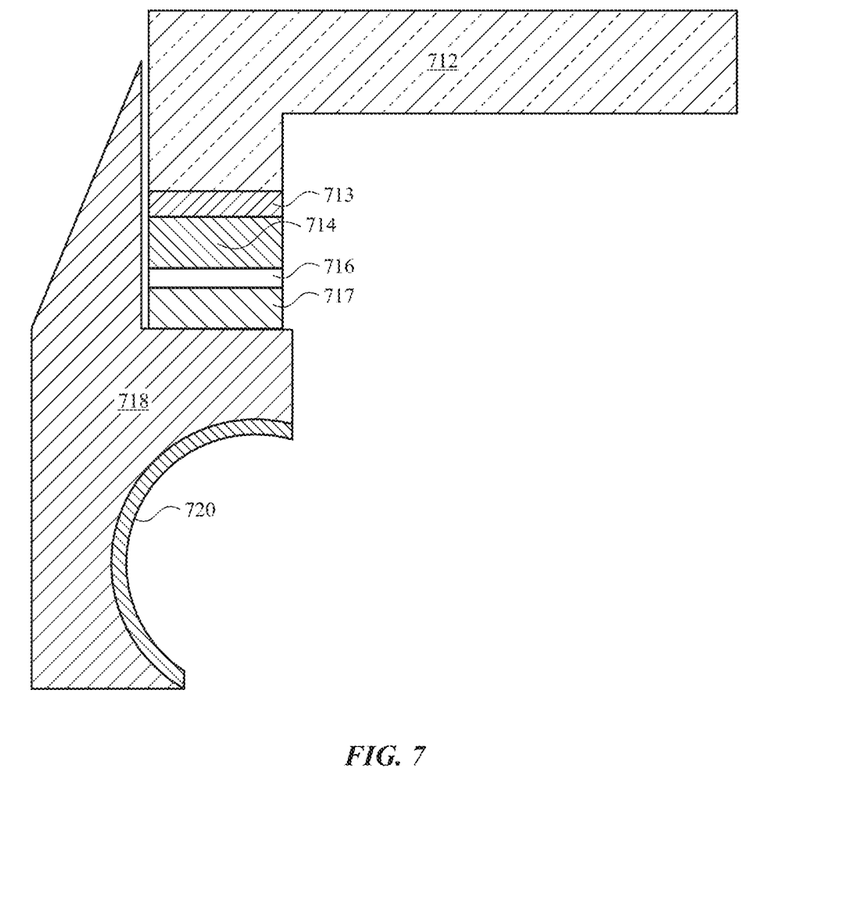
FIG. 7 illustrates a cross section of a portion of an exemplary electronic device including an acoustic touch sensing system utilizing an isolation layer according to examples of the disclosure.

FIG. 7 illustrates a cross section of a portion of an exemplary electronic device including an acoustic touch sensing system utilizing an isolation layer according to examples of the disclosure. The electronic device can include a cover material 712 (which can correspond to cover material 312 above). In some examples, the cover material 712 can be coupled to a transducer 714 such that a wave transmitted by the transducer can propagate along a surface of the cover material. In some examples, the transducer 714 can be disposed on a circuit board 716 that can include electrical connections for driving signals to produce a transmit wave. In some examples, the circuit board 716 can further include electrical connections for sensing signals resulting from reflected acoustic waves received at the transducer 714. In some examples, the circuit board 716 can be coupled to the housing 718 of the electronic device by an isolation layer 717. It should also be understood that in some examples, the order of the stackup of the circuit board 716 and transducer 714 can be flipped without departing from the scope of the present disclosure. In addition, in some examples, additional layers can present between the cover material 712 and the housing 718 without departing from the scope of the disclosure. In addition, in some examples, the transducer 714 may not be directly connected to a circuit board 716 in a stackup, but may be coupled to electrical connections using other techniques known in the art without departing from the scope of the present disclosure. In some examples, the circuit board 716 can be coupled to a housing 718 of the electronic device by an isolation layer 717. In some examples, the isolation layer 717 also provides sealing for the electronic device to prevent intrusion of outside materials such as moisture, dust, and the like from entering into the inside of the housing of the electronic device. In some examples, the isolation layer 717 can provide isolation effects based on impedance mismatch as discussed with regard to FIG. 4. In the illustration of FIG. 7, an absorption layer 720 is shown disposed on an inner surface of a cavity of the housing 718. Referring back to FIG. 3, acoustic waves propagating from the transducer 714 can propagate toward the housing 718, and a portion of the energy that reaches the housing will continue to propagate until a discontinuity (e.g., such as the cavity in the housing) is reached, at which point a portion of the incident energy may be reflected and return to the transducer 714 (e.g., ringing). In some examples, the absorption layer 720 can be added along the surface of the cavity in the housing 718 to absorb a portion of the incident acoustic energy and convert the incident acoustic energy into heat, thus preventing the incident acoustic energy from becoming reflected acoustic energy that can return to the transducer 714. In some examples, the absorption layer 720 can be a material that has a high amount of acoustic absorption. However, as described above with regard to FIG. 4, the amount of energy that crosses the boundary between the housing 718 and the absorption layer 720 can depend on the impedances of the housing and the absorption layer 720. In some examples, in order to maximize the acoustic absorption effect of the absorption layer 720, it can be desirable for the incident acoustic energy to pass the boundary between the housing 718 and the absorption layer 720. Accordingly, in some examples, the material used for the absorption layer 720 can be selected to have a shear modulus that is well matched with the shear modulus of the housing 718. In some examples, the absorption layer 720 can be made by combining a material with a high shear modulus (e.g., tungsten) and a material with a lower shear modulus that is highly attenuating (e.g., a soft epoxy) for the acoustic frequency range of interest. In some examples, the tungsten or other high shear impedance material can be mixed in with an epoxy to produce a material with an average shear impedance that is equal to the shear impedance of the housing 718. In this way, the incident acoustic energy can enter into the absorption layer 720 and the absorption layer can dissipate a portion of the energy, thus preventing it from returning to the transducer 714 and resulting in interference with touch sensing measurements (e.g., ringing).

Figure 8A:
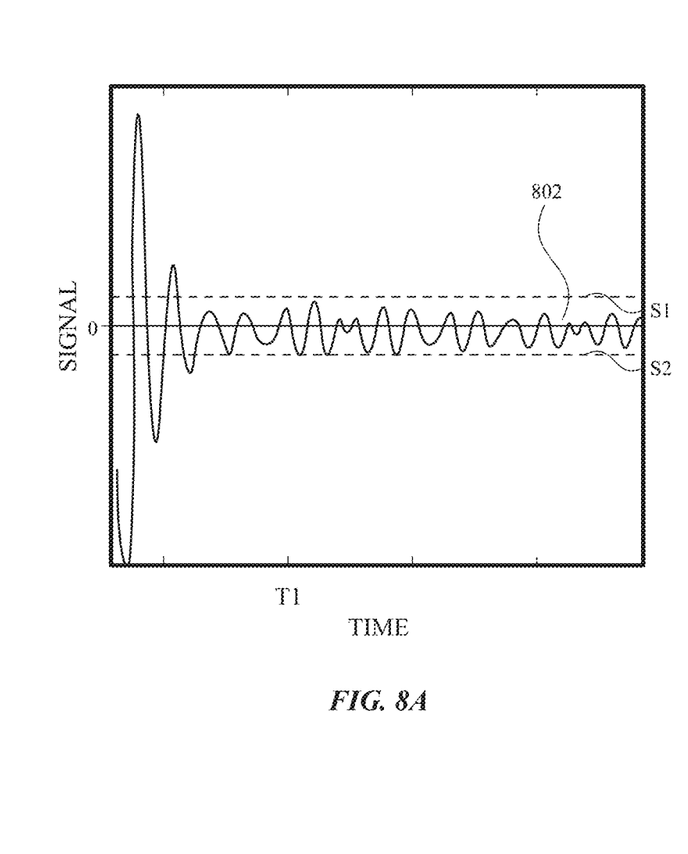
FIGS. 8A and 8B illustrate an effect of an absorption layer to reduce an effect of reflected acoustic waves in an electronic device incorporating acoustic touch sensing according to examples of the disclosure.
Figure 8B:
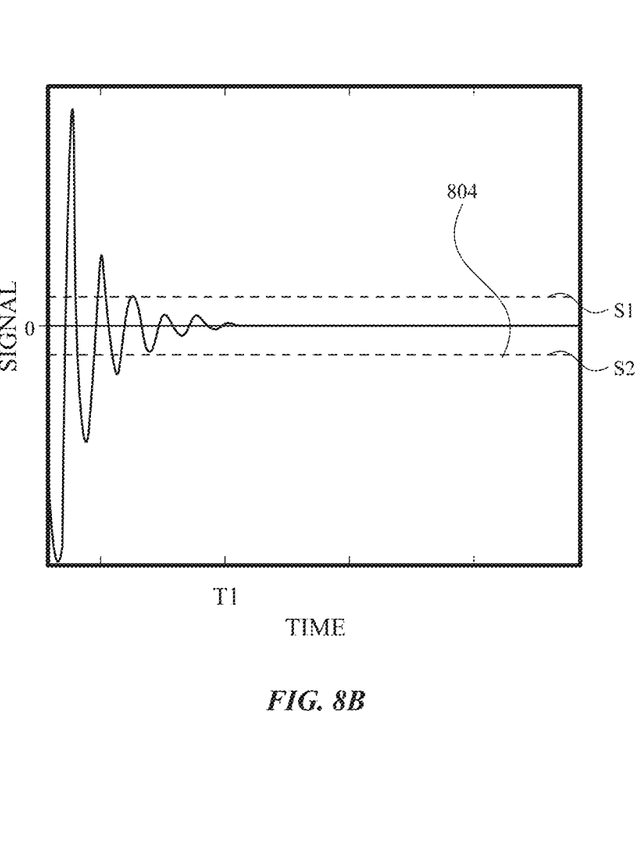

FIGS. 8A and 8B illustrate an effect of an absorption layer to reduce an effect of reflected acoustic waves (e.g., ringing) in an electronic device incorporating acoustic touch sensing according to examples of the disclosure. FIG. 8A illustrates a first waveform 802 representing ringing that can occur as a result of acoustic energy reflecting from the electronic device housing (e.g., 418 as shown in FIG. 4 above). In the illustrated figure, the time period from 0 to $T_1$ can represent a stimulation period during which the excitation energy from stimulation of the transducer is ringing with the transducer. After time $T_1$, the waveforms 802 and 804 can represent the electrical signal produced by the transducer resulting from receiving reflected acoustic waves that have exited the transducer. In the illustrated examples of FIG. 8A, the signal produced can be understood to result from ringing between the transducer and the housing of the electronic device (e.g., 418 as shown in FIG. 4 above). In the waveform 802, the amplitude of the waveform after time $T_1$ fluctuates between a maximum value of S1 and a minimum value of S2 and gradually diminishes as time increases. In FIG. 8B, it can be seen that for waveform 804, the waveform after time $T_1$ reduces in amplitude much more quickly than the waveform 802 in FIG. 6A, and similarly quickly when compared to the reduction in amplitude shown resulting from an impedance mismatch as shown in waveform 504 in FIG. 5B. The waveforms FIGS. 8A and 8B can correspond to a situation where there is no absorption layer (e.g., 720 above) for waveform 702 and a situation where the absorption layer 720 has an impedance closely matched with the electronic device housing (e.g., 718), and a high absorption factor.

Therefore, according to the above, some examples of the disclosure are directed to an electronic device, comprising a front cover material, a transducer assembly coupled to an edge portion of the front cover material by a first adhesive layer, and a second adhesive layer coupled between the transducer assembly and a housing of the electronic device, wherein the second adhesive layer provides a seal around a perimeter of the front cover material and provides an acoustic isolation between the transducer assembly and the housing based on an impedance mismatch between the second adhesive layer and the housing. Additionally or alternatively, in some examples, the second adhesive layer is a foam pressure sensitive adhesive. Additionally or alternatively, in some examples, the first adhesive layer has a first shear modulus, and the second adhesive layer has a second shear modulus, wherein a ratio between the first shear modulus and the second shear modulus is at least about 100:1. Additionally or alternatively, in some examples, the transducer assembly has a third shear modulus and the second adhesive layer has a second shear modulus, wherein a ratio between the third shear modulus and the second shear modulus is at least about 250:1. Additionally or alternatively, in some examples, the transducer assembly has a third shear modulus and the second adhesive layer has a second shear modulus, wherein a ratio between the third shear modulus and the second shear modulus is at least about 1000:1. Additionally or alternatively, in some examples, the housing has a fourth shear modulus and the second adhesive layer has a second shear modulus, wherein a ratio between the fourth shear modulus and the second shear modulus is at least about 250:1. Additionally or alternatively, in some examples, the transducer assembly has a third shear modulus and the second adhesive layer has a second shear modulus, wherein a ratio between the third shear modulus and the second shear modulus is at least about 1000:1. Additionally or alternatively, in some examples, the second adhesive layer has a shear modulus of at most about 0.02 gigapascals.

Some examples of the disclosure are directed to an electronic device, comprising a front cover material a transducer assembly coupled to an edge portion of the front cover material by a first adhesive layer, a second adhesive layer coupled between the transducer assembly and a housing of the electronic device, and an absorption layer disposed upon an inner surface of the housing, wherein the absorption layer is disposed intersecting a wave propagation direction of an acoustic wave produced by the transducer assembly. Additionally or alternatively, in some examples, the absorption layer comprises a soft epoxy and particles of a high shear modulus material. Additionally or alternatively, in some examples, the high shear modulus material comprises tungsten.

Some examples of the disclosure are directed to an electronic device comprising a front cover material, a transducer assembly coupled to an edge portion of the front cover material by a first adhesive layer and an acoustic isolation means for providing isolation between the transducer assembly a and a housing of the electronic device, wherein the acoustic isolation means provides a seal around a perimeter of the front cover material and the acoustic isolation is based on an impedance mismatch between the acoustic isolation means and the housing. Additionally or alternatively, in some examples, the acoustic isolation means is a foam pressure sensitive adhesive. Additionally or alternatively, in some examples, the first adhesive layer has a first shear modulus, and the acoustic isolation means has a second shear modulus, wherein a ratio between the first shear modulus and the second shear modulus is at least about 100:1. Additionally or alternatively, in some examples, the transducer assembly has a third shear modulus and the acoustic isolation means has a second shear modulus, wherein a ratio between the third shear modulus and the second shear modulus is at least about 250:1. Additionally or alternatively, in some examples, the transducer assembly has a third shear modulus and the acoustic isolation means has a second shear modulus, wherein a ratio between the third shear modulus and the second shear modulus is at least about 1000:1. Additionally or alternatively, in some examples, the housing has a fourth shear modulus and the acoustic isolation means has a second shear modulus, wherein a ratio between the fourth shear modulus and the second shear modulus is at least about 250:1. Additionally or alternatively, in some examples, the transducer assembly has a third shear modulus and the acoustic isolation means has a second shear modulus, wherein a ratio between the third shear modulus and the second shear modulus is at least about 1000:1. Additionally or alternatively, in some examples, the acoustic isolation means has a shear modulus of at most about 0.02 gigapascals.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. An electronic device, comprising:
   a front cover material;
   a transducer assembly coupled to an edge portion of the front cover material by a first adhesive layer;
   a second adhesive layer coupled between the transducer assembly and a first surface of a housing of the electronic device, wherein the second adhesive layer provides a seal around a perimeter of the front cover material and provides an acoustic isolation between the transducer assembly and the housing based on an impedance mismatch between the second adhesive layer and the housing; and
   an absorption layer disposed on a second surface of the housing, different from the first surface of the housing, wherein the absorption layer is disposed intersecting a wave propagation direction of an acoustic wave produced by the transducer assembly.

2. The electronic device of claim 1, wherein the second adhesive layer is a foam pressure sensitive adhesive.

3. The electronic device of claim 1, wherein the first adhesive layer has a first shear modulus, and the second adhesive layer has a second shear modulus, wherein a ratio between the first shear modulus and the second shear modulus is at least about 100:1.

4. The electronic device of claim 1, wherein the transducer assembly has a third shear modulus and the second adhesive layer has a second shear modulus, wherein a ratio between the third shear modulus and the second shear modulus is at least about 250:1.

5. The electronic device of claim 1, wherein the transducer assembly has a third shear modulus and the second adhesive layer has a second shear modulus, wherein a ratio between the third shear modulus and the second shear modulus is at least about 1000:1.

6. The electronic device of claim 1, wherein the housing has a fourth shear modulus and the second adhesive layer has a second shear modulus, wherein a ratio between the fourth shear modulus and the second shear modulus is at least about 250:1.

7. The electronic device of claim 1, wherein the transducer housing has a fourth shear modulus and the second adhesive layer has a second shear modulus, wherein a ratio between the fourth shear modulus and the second shear modulus is at least about 120.

8. The electronic device of claim 1, wherein the second adhesive layer has a shear modulus of at most about 0.02 gigapascals.

9. An electronic device, comprising:
   a front cover material;
   a transducer assembly coupled to an edge portion of the front cover material by a first adhesive layer;
   a second adhesive layer coupled between the transducer assembly and a first surface of a housing of the electronic device; and
   an absorption layer disposed upon a second, inner surface of the housing, wherein the absorption layer is disposed intersecting a wave propagation direction of an acoustic wave produced by the transducer assembly.

10. The electronic device of claim 9, wherein the absorption layer comprises a soft epoxy and particles of a high shear modulus material.

11. The electronic device of claim 10, wherein the high shear modulus material comprises tungsten.

12. An electronic device, comprising:
a front cover material;
a transducer assembly coupled to an edge portion of the front cover material by a first adhesive layer;
an acoustic isolation means for providing isolation between the transducer assembly and a first surface of a housing of the electronic device, wherein the acoustic isolation means provides a seal around a perimeter of the front cover material and the acoustic isolation is based on an impedance mismatch between the acoustic isolation means and the housing; and
an acoustic absorption means for intersecting a wave propagation direction of an acoustic wave produced by the transducer assembly at a second surface of the housing, different from the first surface of the housing.

13. The electronic device of claim 12, wherein the acoustic isolation means is a foam pressure sensitive adhesive.

14. The electronic device of claim 12, wherein the first adhesive layer has a first shear modulus, and the acoustic isolation means has a second shear modulus, wherein a ratio between the first shear modulus and the second shear modulus is at least about 100:1.

15. The electronic device of claim 12, wherein the transducer assembly has a third shear modulus and the acoustic isolation means has a second shear modulus, wherein a ratio between the third shear modulus and the second shear modulus is at least about 250:1.

16. The electronic device of claim 12, wherein the transducer assembly has a third shear modulus and the acoustic isolation means has a second shear modulus, wherein a ratio between the third shear modulus and the second shear modulus is at least about 1000:1.

17. The electronic device of claim 12, wherein the housing has a fourth shear modulus and the acoustic isolation means has a second shear modulus, wherein a ratio between the fourth shear modulus and the second shear modulus is at least about 250:1.

18. The electronic device of claim 12, wherein the transducer housing has a fourth shear modulus and the acoustic isolation means has a second shear modulus, wherein a ratio between the fourth shear modulus and the second shear modulus is at least about 120:1.

19. The electronic device of claim 12, wherein the acoustic isolation means has a shear modulus of at most about 0.02 gigapascals.

20. The electronic device of claim 1, wherein the housing has a fourth shear modulus and the second adhesive layer has a second shear modulus, wherein a ratio between the fourth shear modulus and the second shear modulus is at least about 200:1.

* * * * *

UNITED STATES PATENT AND TRADEMARK OFFICE
CERTIFICATE OF CORRECTION

PATENT NO. : 10,877,606 B2
APPLICATION NO. : 16/390911
DATED : December 29, 2020
INVENTOR(S) : Ehsan Khajeh et al.

It is certified that error appears in the above-identified patent and that said Letters Patent is hereby corrected as shown below:

In the Claims

In Column 16, Lines 49-50, in Claim 7, before "housing" delete "transducer".

In Column 16, Line 53, in Claim 7, delete "120." and insert --120:1.--.

In Column 18, Lines 14-15, in Claim 18, before "housing" delete "transducer".

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*